United States Patent
Alonzo et al.

(10) Patent No.: US 10,007,951 B2
(45) Date of Patent: Jun. 26, 2018

(54) IT ASSET MANAGEMENT TREND CHARTING FOR COMPLIANCE OVER TIME

(75) Inventors: Jason A. Alonzo, Fair Oaks, CA (US); John L. Yee, San Mateo, CA (US); Umesh M. Apte, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 875 days.

(21) Appl. No.: 12/845,376

(22) Filed: Jul. 28, 2010

(65) Prior Publication Data

US 2010/0299168 A1 Nov. 25, 2010

Related U.S. Application Data

(63) Continuation-in-part of application No. 11/847,723, filed on Aug. 30, 2007, now Pat. No. 7,945,490.

(51) Int. Cl.
| | |
|---|---|
| *G06Q 40/06* | (2012.01) |
| *G06Q 40/00* | (2012.01) |
| *G06Q 10/08* | (2012.01) |
| *G06Q 30/02* | (2012.01) |

(52) U.S. Cl.
CPC .......... *G06Q 40/06* (2013.01); *G06Q 10/087* (2013.01); *G06Q 30/0201* (2013.01); *G06Q 40/12* (2013.12)

(58) Field of Classification Search
USPC ........................................................ 705/30
See application file for complete search history.

(56) References Cited

U.S. PATENT DOCUMENTS

| | | | |
|---|---|---|---|
| 7,617,270 B2 | 11/2009 | Nikitin | |
| 7,761,369 B2 * | 7/2010 | Bell | G06Q 10/10 705/35 |
| 7,945,490 B2 | 5/2011 | Alonzo et al. | |
| 8,397,128 B1 * | 3/2013 | Alonzo | G06Q 10/06 714/4.1 |
| 2002/0188485 A1 * | 12/2002 | Benny | G06Q 10/10 703/1 |
| 2002/0188493 A1 * | 12/2002 | Benny | G06Q 10/10 703/22 |
| 2002/0188739 A1 * | 12/2002 | Benny | G06Q 10/06 709/230 |
| 2003/0233287 A1 * | 12/2003 | Sadler et al. | 705/28 |
| 2004/0024658 A1 * | 2/2004 | Carbone et al. | 705/28 |
| 2004/0024660 A1 * | 2/2004 | Ganesh et al. | 705/28 |
| 2004/0230507 A1 * | 11/2004 | Davidovitch et al. | 705/35 |
| 2005/0002380 A1 * | 1/2005 | Miller et al. | 370/352 |

(Continued)

*Primary Examiner* — Bruce I Ebersman
*Assistant Examiner* — Kevin Poe
(74) *Attorney, Agent, or Firm* — Kilpatrick Townsend & Stockton LLP

(57) ABSTRACT

Systems, methods, and computer-readable media in accordance with various embodiments of the present invention facilitate storing and displaying, in a trending analysis graphical user interface, of data for each execution of the underlying metric data alongside the date for which the metric was run. As the metrics are run, calculations may also take into account user setup (role access) for the assets for which they have control to view. Additional run control parameters could be set, for example for managing reconciliation discrepancies, to control whether or not to include exceptions that have been ignored by the user.

18 Claims, 17 Drawing Sheets

(56) References Cited

U.S. PATENT DOCUMENTS

| | | | |
|---|---|---|---|
| 2005/0222928 A1* | 10/2005 | Steier | G06O 40/00 705/35 |
| 2005/0222929 A1* | 10/2005 | Steier | G06Q 40/00 705/35 |
| 2006/0129415 A1* | 6/2006 | Thukral et al. | 705/1 |
| 2006/0178954 A1* | 8/2006 | Thukral | G06Q 10/087 705/28 |
| 2006/0265408 A1* | 11/2006 | Pini | 707/100 |
| 2007/0244777 A1 | 10/2007 | Torre et al. | |
| 2008/0162308 A1* | 7/2008 | Sharma | G06Q 10/087 705/28 |
| 2008/0208897 A1* | 8/2008 | Lew et al. | 707/103 R |
| 2008/0291023 A1* | 11/2008 | Anderson et al. | 340/572.1 |
| 2009/0119229 A1* | 5/2009 | Fudali | G06Q 40/025 705/36 R |

* cited by examiner

FIG. 2

Inventory Exceptions — 200

Amount in 1000's     Currency: USD    Rate Type: CRRNT

| Business Rule | Exceptions | NBV | Cost | FMV |
|---|---|---|---|---|
| Custodian Differ | 30 | | | |
| Custodian DeptID Differ | 33 | | | |
| Unauthorized Software | 68 | | | |
| Asset not in ARM | 21 | | | |
| Asset not in Discovery | 70 | 25.707 | 113.499 | 21.503 |
| Location Differ | 1 | | | |
| Manufacturer Differ | 10 | | | |
| Model Differ | 18 | | | |

202 points to the Exceptions column. 204 = NBV, 206 = Cost, 208 = FMV.

Last Updated: 07/05/06 3:09:59PM

| Field | Op | Value |
|---|---|---|
| Financial List | = | |
| Business Rule | = | Serial ID-ARM |
| Financial Impact | = | Yes |
| Financial Status | = | |
| Serial Number | = | |
| Asset ID | = | |
| Business Unit HR | = | |
| Business Unit AM | = | |
| Manufacturer ID Discovery | = | |
| Manufacturer ID ARM | = | |
| Model Discovery | = | |
| Model ARM | = | |
| Custodian Discovery | = | |
| Custodian ARM | = | |
| Department Discovery | = | |
| Department ARM | = | |

302, 304

[ Search ]   [ Clear ] — 306

400

| Search Results | | | | | | | | | | |
|---|---|---|---|---|---|---|---|---|---|---|
| ☑ Select All    ☐ Clear All | | | | | | | | | | |
| Assets with Rule Exceptions | | | | Customize | Find | View All | | First ◀ 1-10 of 53 ▶ | Last | |
| Device Data | Business Data | Financial Information | | | | | | | | |
| | Select | ! | Serial Number Discovery | Serial Number ARM | ! | Manufacturer Discovery | Manufacturer ARM | ! | Model Discovery | Model ARM | Log |
| 1 | ☑ | ⚠ | | 000000000001 | | | | | | | 📄 |
| 2 | ☐ | ⚠ | | 109RMP2AY | | | TOSHIBA CORPORATION | | | TECRA M1 | 📄 |
| 3 | ☐ | ⚠ | | 1107124003 | | | | | | | 📄 |
| 4 | ☐ | ⚠ | | 22770PUQDU | | | TOSHIBA CORPORATION | | | PORTEGE 2000 | 📄 |
| 5 | ☑ | ⚠ | | 2400MM2SV | | | TOSHIBA CORPORATION | | | TOSHIBA PORTEGE 2010 | 📄 |
| 6 | ☑ | ⚠ | | 3027PK9UT | | | TOSHIBA CORPORATION | | | | 📄 |
| 7 | ☑ | ⚠ | | 40410AWQH | | | TOSHIBA CORPORATION | | | EQUIUM 7100D | 📄 |
| 8 | ☑ | ⚠ | | 41954UVRG | | | IBM | | | IBM 23738U0 | 📄 |
| 9 | ☑ | ⚠ | | 50055USUD | | | TOSHIBA CORPORATION | | | TECRA 8100 | 📄 |
| 10 | ☑ | ⚠ | | 5013B2UJKN | | | DELL | | | GXL620 | 📄 |

☑ Select All    ☐ Clear All

[ Select Actions ]    Advanced Sort

▽ Financial Impact

| | |
|---|---|
| Total NBV Selected | 2839.630 |
| Total Cost Selected | 12999.000 |
| Total FMV Selected | 3213.000 |
| Currency Code | USD |
| Rate Type | SPOT |
| Financial List | Q407 🔍 |
| Description | Retirements Fiscal Q4 2007 |

[ Update Totals ]  [ Save ]  [ Notify Finance ]  [ Archive ]
                                    ↑
Review Action Errors           502

*1000*

| | Select | Serial ID | Business Unit | Asset Identification | Net Book value | Cost | Fair |
|---|---|---|---|---|---|---|---|
| 1 | ☐ | 000000000001 | US001 | 000000000001 | | | |
| 2 | ☐ | 2400MM2SV | US001 | ITZ014 | 574.940 | 2775.000 | |
| 3 | ☑ | 3027PK9UT | US001 | ITZ008 | 574.940 | 2775.000 | |
| 4 | ☑ | 40410AWQH | US001 | ITZ034 | 327.540 | 1444.000 | |
| 5 | ☑ | 41954UVRG | US001 | ITZ077 | 487.720 | 2150.000 | |
| 6 | ☐ | 50055USUD | US001 | ITZ043 | 521.770 | 2300.000 | |
| 7 | ☐ | 5013B2UJKN | US001 | ITZ053 | 352.720 | 1555.000 | |

☑ Select All   ☐ Clear All

▽ Financial Impact

| | |
|---|---|
| Total NBV Selected | 1390.200 |
| Total Cost Selected | 6369.000 |
| Total FMV Selected | 1595.000 |
| Currency Code | USD |
| Rate Type | SPOT |
| Financial List | Q407 |
| Description | Retirements Fiscal Q4 2007 |

[Update Totals]  [Save]  [Send to worklist]  [Archive]

Assets Not Reporting

Amount in 1000's   Currency: USD   Rate Type: SPOT

| Inventory Age Seq | Inventory Age | SubType | Quantity | NBV | Cost | FMV |
|---|---|---|---|---|---|---|
| 1 | 3 weeks | Servers | 3 | 0.599 | 2.25 | 0 |
| 2 | 6 weeks | Desktop | 18 | 6.401 | 24.045 | 0.8 |
| 2 | 6 weeks | Servers | 3 | 0.599 | 2.25 | 0 |
| 3 | 9 weeks | All Devices | 58 | 26.27 | 102.658 | 6.35 |

Last Updated: 07/05/06 3:09:14PM

FIG. 11

Personalize Content | Layout

Inventory Exceptions — 1500

Amount in 1000's  Currency: USD  Rate Type: SPOT

| Business Rule | Exceptions | Net Book Value | Cost | Fair Value |
|---|---|---|---|---|
| Custodian Differ | 28 | | | |
| Custodian DeptID Differ | 29 | | | |
| Unauthorized Software | 68 | | | |
| Asset not in Discovery | 21 | | | |
| Asset not in ARM | 71 | 0 | 113,498 | 21,503 |
| Location Differ | 1 | | | |
| Manufacturer Differ | 9 | | | |
| Model Differ | 17 | | | |

Last Updated Date/Time: 08/27/09 6:09:20PM

Time Span 365 Days  Period Quarterly

Exceptions Trend (bar chart: Serial ID-ARM, Software)
Number/Count axis 0–150
Time Span: 2009-03-31, 2009-06-30, 2009-09-30, 2009-12-31

Assets Not Reporting

Amount in 1000's  Currency: USD  Rate Type: SPOT

| Inventory Age Seq | Inventory Age | Sub Type | Quantity | Net Book Value | Cost | Fair Value |
|---|---|---|---|---|---|---|
| 1 | 3 weeks | Servers | 3 | 0 | 2.25 | 0 |
| 2 | 6 weeks | Desktop | 18 | 0 | 24,045 | 0.8 |
| 2 | 6 weeks | Servers | 3 | 0 | 2.25 | 0 |
| 3 | 9 weeks | All Devices | 57 | 4 | 99,908 | 21.35 |

Software Inventory Monitor

| Software Title | Inventory | Installed | Employee Authorized | Employee UnAuthorized |
|---|---|---|---|---|
| Adobe Acrobat Professional | 50 | 34 | 1 | 15 |
| Adobe Photoshop | 250 | 22 | 0 | 10 |
| Dreamweaver | 50 | 3 | 0 | 2 |
| Microsoft Office 2000 | 50 | 1 | 0 | 1 |
| Microsoft Office 2003 | 50 | 136 | 1 | 66 |

Last Updated: 08/27/2009 6:09:08PM

Lease End Metric

| Lessor | Days Before End Date | Lease |
|---|---|---|
| DELL-001 | 5 | Dell laptop lease |

Last Updated Date/Time: 01/26/2010 2:04:04AM

Software Device Monitor

Group ID: CEO
Group Name: CEO's Group

| Software Title | Alert | Installed | Authorized | Declared | Unresolved |
|---|---|---|---|---|---|
| Adobe Acrobat Professional | △ | 5 | 4 | 18 | 13 |
| Adobe Photoshop | △ | 5 | 4 | 18 | 7 |
| Dreamweaver | | | | 0 | 1 |
| Microsoft Office 2003 | △ | 18 | 4 | 18 | 51 |

Last Updated: 08/27/2009 6:09:08PM

Software Pending Requisitions

FIG. 15

Favorites | Main Menu > IT Asset Management > Asset Discovery and Validation > Manage Exceptions

Manage Exceptions

▶ Search

Search Results

☑ Select All  ☐ Clear All

Assets with Rule Exceptions

Customize | Find | View 100 | 🔲 | First ▼ | 11-20 of 161 | ▲ Last

| Device Data | Business Data | | | | | | | |
|---|---|---|---|---|---|---|---|---|
| Select | Exists | ! | Serial Number Discovery | Serial Number ARM | ! | Manufacturer Discovery | Manufacturer ARM | ! | Model Discovery | Model ARM | Log |
| 11 | ☐ | | 1J1CJMWZM276 | 1J1CJMWZM276 | ⚠ | Hewlett-Packard | Compaq | | Evo N400c | Evo N400c | 📄 |
| 12 | ☐ | | 1J23JMW2T2L6 | 1J23JMWZT2L6 | | Compaq | Compaq | | Evo N400c | Evo N400c | 📄 |
| 13 | ☐ | Exists | 1J28KVBZJ21D | | | | | | | | 📄 |
| 14 | ☐ | ⚠ | | 2158779278 | | | SUN | | | Ultra 5_10 | 📄 |
| 15 | ☐ | ⚠ | | 22770PUQDU | | | TOSHIBA CORPORATION | | | PORTEGE 2000 | 📄 |
| 16 | ☐ | ⚠ | | 2400MM2SV | | | TOSHIBA CORPORATION | | | TOSHIBA PORTEGE 2010 | |
| 17 | ☐ | | 29HLF11 | | | | | | Latitude C400 | | |
| 18 | ☐ | | 2UA403P15R | 2UA403P15R | | Hewlett-Packard | Hewlett Packard | ⚠ | hp Compaq nc6000 (DE64s6AV) | HP Compaq nc6000 | 📄 |
| 19 | ☐ | ⚠ | | 3027PK9UT | | | TOSHIBA CORPORATION | | | | 📄 |
| 20 | ☐ | ⚠ | 37M2S21 | | | Dell Computer Corporation | | | OptiPlex GX260 | | |

Advanced Sort

☑ Select All  ☐ Clear All

Select Actions | Ignore Exceptions

FIG. 23

IT ASSET MANAGEMENT TREND CHARTING FOR COMPLIANCE OVER TIME

CROSS-REFERENCES TO RELATED APPLICATIONS

This Application is a Continuation-in-Part of commonly owned and copending U.S. application Ser. No. 11/847,723, filed Aug. 30, 2007 and entitled "Providing Aggregate Forecasted Impact Information for Physical to Financial Asset Reconciliation," which is hereby incorporated by reference for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The disclosure of this patent document relates generally to the management of assets, and more particularly to the reconciliation of physical and financial asset information and forecasting of information for reconciliation exceptions.

Large organizations often have trouble keeping track of their assets as the assets are purchased and deployed throughout the organization. Proper accounting and tracking of these assets are necessary to ensure compliance with arrangements such as leases and software licenses. Additionally, organizations may need to ensure there are no material discrepancies between the physical existence of these assets and what is recorded on the financial set of books.

For example, physical assets such as laptop computers and portable electronic devices (which are often prone to loss or theft) are typically accounted for not only in physical inventory but also as financial assets of a company for accounting, auditing, and other financial purposes. Further complicating matters is the fact that organizations can be very large and thus can have large numbers of asset reconciliation exceptions across an enterprise. Often times an organization will rely on the information that is stored in a financial system to track and manage their assets; however this rarely reflects the real world of assets that are actually deployed within the organization. The financial information lacks the impact of events such as operational asset disposal, unrecorded sales, theft, etc.

Increasingly, organizations are deploying asset tracking (physical discovery) mechanisms that can retrieve the actual asset information as the asset is utilized in the organization. Organizations then take the information that comes from the physical discovery and reconcile that information back to the financial system. In one current approach, organizations utilize software packages from various "discovery" vendors. The discovery vendor software is typically installed on, or pushed onto, information technology (IT) devices such as servers, desktops, or laptops. The discovery software can then perform an inventory scan of devices across an enterprise and reports back device information which can include such data as the device manufacturer, model, serial number, etc. The discovery software also can report back on the various software installed and/or activated on the device. The reported data thus can be used to determine the number and type of each asset across the enterprise.

This data can then be used with a product such as PeopleSoft IT Asset Management (ITAM), available from Oracle Corporation of Redwood Shores, Calif., which integrates data from third party discovery vendors, where the vendor solutions discover and take inventory of intelligent IT devices connected to an organization's network. The information obtained includes details and/or attributes about each IT device, such as the manufacturer, model, machine name, installed software, and serial number. A physical count of the number of IT devices, for example, then can be compared with information stored in an asset repository containing financial asset information. Typically, this involves doing manual queries and then manually creating reports in spreadsheet applications in order to determine where discrepancies might exist between the physical asset information and the financial asset information. Further, determining financial impact information for these discrepancies is an even more arduous manual task.

Accordingly, what is desired is to solve problems relating to tracking discrepancies that might exist between physical asset information and financial asset information, some of which may be discussed herein. Additionally, what is desired is to reduce drawbacks related to visualizing financial impact information for these discrepancies, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Systems and methods in accordance with various embodiments of the present invention provide to store and display, in a trending analysis graphical user interface, the data for each execution of the underlying metric data alongside the date for which the metric was run. As the metrics are run, calculations may also take into account user setup (role access) for the assets for which they have control to view. Additional run control parameters could be set, for example for managing reconciliation discrepancies, to control whether or not to include exceptions that have been ignored by the user.

In further embodiments, systems and methods are provided that calculate monthly and quarterly averages to smooth out abnormal events or anomalies in the data. During the same process run, the process may calculate the year ago averages for monthly and quarterly average to present a year over year comparison. This comparison may be provided as hover text when the user "mouses over" a chart's data points visualizing one or more trends. A chart may further include both the previous period's values as well as the value represented as a percentage of change. Thus, an organization may visualize how the organization is progressing toward compliance or removal of business rule exceptions against previous time spans.

In some embodiments, a user may modify a time span parameter to draw a bar chart or line graph aggregating for periods daily, monthly or quarterly across various time spans. A chart may be pre-configured with various time spans including, daily, weekly, monthly, quarterly, half yearly, and for a year. In some aspects, systems and methods can be configured to both manage exceptions and assets not reporting so the trending analysis will include those business rule exceptions that are selected for trending or those inventory ages or subtypes of interest. There may be certain business rule exceptions that should be included and/or excluded from analysis, for example temporary rules, or rules based on geographies or asset types for which trending is not a valid business need. Furthermore a separate trending chart may show the forecasted financial impact of both the missing asset exceptions as well as those that are no longer reporting.

In still further embodiments, a user may click on a bar chart or line graph data point to transfer the user to view exceptions or exception data in a manage exceptions or assets not reporting user interface, page, or component. The transfer may take a rule or inventory age as a search parameter for the component and execute a search to display the current exceptions or assets that are not reporting.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 2 illustrates an exemplary interface that can be used to display asset exceptions in accordance with one embodiment of the present invention.

FIG. 3 illustrates an exemplary interface that can be used to search for exceptions using additional parameters in accordance with one embodiment of the present invention.

FIG. 4 illustrates an exemplary interface that can be used to view individual asset information in accordance with one embodiment of the present invention.

FIG. 5 illustrates an exemplary interface that can be used to display aggregate financial impact information in accordance with one embodiment of the present invention.

FIG. 8 illustrates an exemplary interface that can be used to choose to retire, route, or save asset information in accordance with one embodiment of the present invention.

FIG. 9 illustrates an exemplary interface that can be used to retire assets in accordance with one embodiment of the present invention.

FIG. 10 illustrates an exemplary interface that can be used to choose to retire, route, or save remaining asset information in accordance with one embodiment of the present invention.

FIG. 11 illustrates an exemplary interface that can be used to display information for assets not reporting in accordance with one embodiment of the present invention.

FIG. 15 illustrates an exemplary portal or dashboard that can be used to display asset exceptions and asset management tends in accordance with one embodiment of the present invention.

FIG. 23 illustrates an exemplary interface that can be used to manage exceptions in search results in accordance with one embodiment of the present invention.

DETAILED DESCRIPTION OF THE INVENTION

Figure 1:
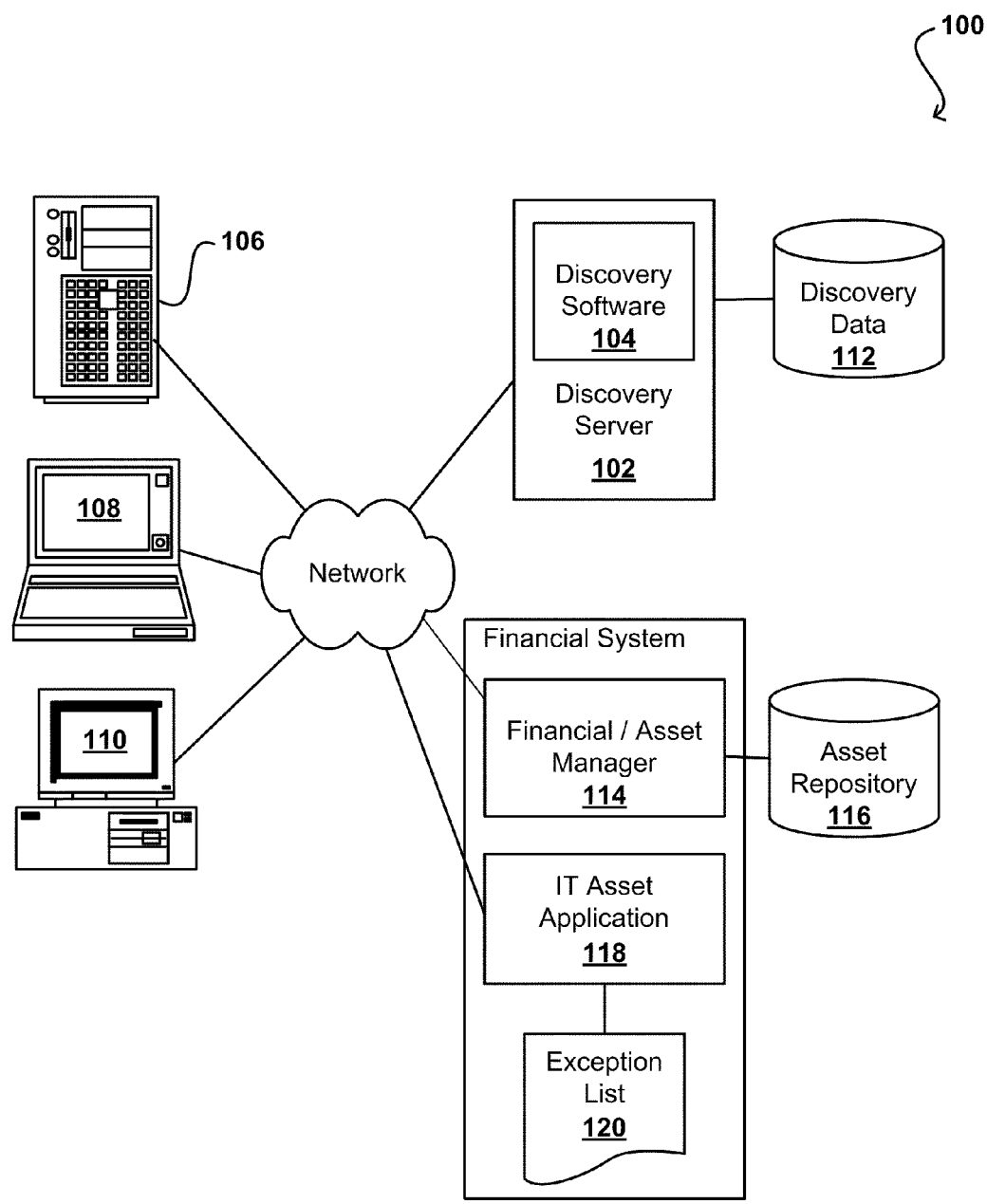
FIG. 1 illustrates a system that can be used for physical and financial asset reconciliation in accordance with one embodiment of the present invention.

Systems and methods in accordance with various embodiments can overcome the aforementioned and other deficiencies in asset management and financial systems by changing the way in which discrepancies between physical and financial assets are handled. For example, a system in accordance with one embodiment provides an aggregate view of the financial impact of various discrepancies. The system runs a reconciliation process and identifies assets that reside in a financial asset repository of the system, for example, but do not show up as a physical asset in the real world, such as may be determined from a discovery portion of the system. A discrepancy might exist because a physical asset was lost or stolen, is no longer operational, or any other such reason. In such a case, where the physical asset corresponds to a capitalized asset, a decision needs to be made as to whether to retire or dispose of the asset from a financial perspective. By aggregating financial information and forecasting the financial impact on parameters such as cost, fair market value, and net book value, a CFO or other financial decision maker can better determine whether to retire or dispose of at least some of those assets or whether to expend the time and energy to attempt to locate at least some of those assets.

Such a system also provides a mechanism for partitioning or grouping this aggregate financial information and routing the information to the stakeholders of an asset or the stakeholder of the financial information associated with the asset. It is likely that the person managing the IT assets and determining whether the assets exist probably does not have the authority or expertise to determine, from a financial perspective, whether an asset should be retired. The person also might not know which triggers need to occur in order to actually perform the financial retirement. The grouping mechanism thus provides a way for a functional person in a physical environment to provide a finance person with aggregate information about the assets, along with the financial impact of each of those assets, as well as those assets in total.

An asset manager thus can review the discrepancies for capitalized assets that are no longer found by a physical asset discovery system and route the asset information to the finance organization for retirement in order to resolve the discovered discrepancy. The finance organization can benefit from knowing how many total assets are going to be recommended for retirement and, more importantly, the financial impact of the retirement of those assets. This information becomes particularly critical near quarter-end and year-end, as any material impact to the books requires timely disclosure.

Once a list of exceptions is created, the list can be routed to finance using any appropriate messaging or routing technology known or used in the art, such as by sending an email message that includes a link to the information. A finance manager (or other appropriate user) then can bring up the list of assets in an application that is tailored to the financial needs of an organization. In some scenarios, a finance manager may not have access to all the other assets. In further scenarios, a finance manager may be secured against being able to do certain types of transactions, such as updating the asset repository. The finance manager might then simply receive a view of the specific assets at issue, and the manager might have role access to that particular view. Such an approach does not require a finance manager to need more extensive training. Moreover, a finance manager does not have to be a "super user" or have a higher level of access. The finance manager can simply view the information that is important to the manager, which is a particular set of financial assets. From the asset list the financial manager can route those assets to other people in the finance department responsible for those assets. The finance manager also can put at least some of these assets into a worklist and route the worklist to the appropriate person(s). The finance manager may also work the list, using the financial forecast information to decide which assets to retire, and then route what is left to other finance employees, etc. Thus, there are many different avenues through which to handle the assets.

FIG. 1 illustrates an exemplary configuration 100 that can be used for the discovery and reconciliation of physical and financial assets for a given entity. In this example, an instance of the discovery vendor software 104 is installed on a discovery server 102 or other device across the network for the entity. In some embodiments, the software may be installed remotely or may have at least one component installed on each device to be monitored. The discovery software 104 can communicate with each appropriate intelligent device, such as a server 106, laptop 108, or desktop 110, and can gather "discovery" information such as serial number, number of processors, installed software, etc. This discovery information then can be written to a discovery data store 112. A separate financial system device 114, from which asset data can be obtained, is used to gather financial asset information and store that information to an asset repository 116. Once the discovery and asset information is obtained, an IT asset management (ITAM) application 118 can query and analyze the data in the discovery data store 112 and asset repository 116 in order to reconcile the physical and financial assets. After doing the reconciliation, the ITAM application 118 can generate a list of exceptions 120, such as where assets were found in the financial system that do not exist in the discovery data. The list can take any appropriate form, such as a report or spreadsheet generated for review, or can include at least one message sent to a user or owner responsible for the exception.

The discovery software 104 does an inventory of intelligent devices across the entity network, within an entity domain, or using specified address ranges, to obtain inventory information for each such device. An example of such discovery software is the FrontRange Discovery package presently available from FrontRange Solutions of Pleasanton, Calif. This information, relating to physical inventory for an entity, then can be compared with the financial books or information for the entity, stored in the asset repository 116 in this example. The financial information can be gathered and maintained by any appropriate product, such as PeopleSoft Enterprise IT Asset Management (ITAM) available from Oracle Corporation of Redwood Shores, Calif. A data store for a product such as ITAM typically revolves around the asset management tables or solution, and provides information such as the net book value of an IT asset given depreciation, etc.

In one embodiment, an asset manager creates a 'financial list' of capitalized assets that need to be reviewed from a finance perspective and retired or disposed from a financial and physical perspective. This financial list is sent through workflow to the finance organization in aggregate, and a finance manager either approves or denies the retirements in total, in groups, or on an individual basis. For example, the asset manager may have eight servers that need to be retired with a total Cost of $124,000. In a one-click embodiment the asset manager can save the assets to a financial list, such as may be titled 'Missing Servers,' and can route the list to finance. Finance can retrieve the list and can approve all, some, or none of the transactions, and may ask for additional research to be done in situations where the impact is material. For example, the finance manager may decide to retire the oldest assets without requiring further investigation because the impact is immaterial. However, the two newest assets in the list may result in a material impact should the assets be written-off the books. Therefore, the finance manager may require the asset manager to perform further investigation to ensure that the asset is unable to be located before proceeding with the write-off. As discussed above, a system in accordance with one embodiment can provide Net Book Value and Fair Market Value information in addition to Cost information.

The use of workflow routing in one embodiment also provides for an ad hoc email message, SMS, or other appropriate notification to be generated that contains information such as the financial list title and any appropriate message, as well as a link to review the list. The message can be generated for an individual or sent to all the role users to whom financial transactions would ordinarily be routed.

In one embodiment, an additional inquiry is provided for the financial manager that is accessible from the message or via traditional navigation. The inquiry provides the list detail in an easy-to-read display, as well as links to individually retire the assets. Such a feature presents the financial manager with a single, easily accessible location to review the aggregate financial information, retire individual assets, and/or to route the entire list into the retirement workflow. A user viewing the information may not have the ability to retire an asset, as they can be in a hierarchical or role-based structure that determines who can retire certain assets.

The financial list can assist an asset manager in understanding which exceptions should be investigated and resolved immediately. For example, if there is an asset not in the discovery system that has a remaining net book value of $250,000, the asset manager will likely follow up on that exception over others that are less expensive. A financial list also will assist a finance asset manager in prioritizing their workload. As an example, fifty assets may be submitted to the finance manager for retirement, where the remaining net book value for the majority of the assets is zero. However, the remaining net book value for two of those assets is $50,000 each. Because retiring these two assets will have an expense impact from the retirement due to the write-off of the remaining net book value, it is highly likely that the finance manager will want to retire those two assets first, to ensure that the financial impact is captured before finance closes its ledger for the period. Other assets may be left to be retired in the future since there is no financial impact associated with the retirement.

The financial list also can be used as a barometer to assess which items may require further research. Using the retirement example above, the finance manager may decide to do a mass write-off or retirement for those assets that have no remaining net book value. However, because two assets have a material impact to the financials, the finance manager may request that the asset manager perform additional research on those assets to ensure that retirement is really in order, or to determine if there is an alternative to retirement. The asset manager may do additional research on the two assets in question and determine that those assets are able to be repaired at a nominal cost, and are therefore not damaged beyond repair. The assets then can be removed from the finance worklist and repair work can begin on the assets.

Such a system also can display enhanced metrics that display not only basic discrepancy information but that also include the financial impact of all the un-reconciled capitalized assets that potentially face retirement. Such a metric can be presented in a 'CFO Portal,' for example, where the CFO would immediately be made aware of the total impact that all missing assets have on the books.

For each physical asset to be retired, there must be a reason for retirement, e.g., the asset was lost or stolen. There also is financial book information as to which assets would need to be retired, and some financial calculations that would need to be reviewed. When an asset is finally retired, due to being missing, broken, old, etc., the asset is removed from physical use. A record of the retired asset will still reside on the financial books as a zero cost asset, however, such that there is still a record of the asset and thus an audit trail.

An exception-based interface is used in one embodiment to retire these assets. In such an interface, a stakeholder, in this case finance, can be presented with a tailored view of these assets. Thus instead of the assets being blindly routed to finance, an IT manager can view the exceptions and route the exceptions to finance with aggregate financial impact information and a tool whereby the finance employee can route an exception to another user, retire the asset corresponding to the exception, or remove the asset from the exception list and attempt to locate or reconcile the physical asset. This provides another layer of functionality to help departments and users such as finance.

Such a tool can apply not only in a managed exceptions situation, but also in the case where an asset is not reporting. In the "assets not reporting" situation, a set of high level metrics can be used that do more than simply call attention to each of the nonreporting assets. For managed exceptions, a problem with two assets may be contained in the managed exceptions indicating that one of the assets was located and the other was not. The tool then can associate an aggregate with those assets, such that the high level metric applies to both managed exceptions. Another metric for "assets not reporting" deals with assets that were found at one point but now cannot be located.

In one embodiment, a displayed list of exceptions breaks down the exceptions by type of exception, for example, such as "Asset not in Discovery." The list can include a number of assets, and there can be financial information associated therewith such as a Net Book Value (NBV) column 204, a Cost column 206, and a Fair Market Value (FMV) column 208 as shown for the Asset Not in Discovery row 202 of an exemplary Inventory Exceptions interface page 200 of FIG. 2. Thus, at a high or enterprise level, a user can view the information and know that there are 70 assets that are not located in the discovery system, and can also know the aggregate cost of those assets. In some instances 70 might be a manageable number, but when the discrepancies get above that manageable number another business process might kick in. Driving things from a high aggregate level then might produce different results than working on the individual detail of those assets. Prior to this feature a user would have had to go into the information for each asset, retrieve the cost information, sum the information, and manually produce an aggregate number. This system instead provides the user with multiple types of aggregate information alongside the number and type of exception, which provides for quick and easy management on the part of a financial or other appropriate user. A user such as a CFO will greatly appreciate such a view without the need to obtain exception information, run the appropriate queries to obtain information, build a spreadsheet, etc.

When an asset manager views the exceptions list, the manager can have the option of selecting an item, such as a hyperlink associated with the cost information, in order to view information about the exceptions. An application page 300 can be displayed, such as is shown in FIG. 3, which can include various additional parameters that can be selected to search through the exceptions. By selecting one of the links from the previous page, the relevant information can be pre-populated in this page, such as an option 302 specifying the appropriate business rule and an option 304 indicating that only assets with a financial impact should be returned in the result set. Once any additional parameters are set, a search option can be selected that searches the existing managed exceptions results with the addition of the financial impact option and any additional option selected by the user. A search results page portion 400 will be displayed, such as is shown in FIG. 4. This page shows a list of assets matching the query, along with any discovery information for the assets displayed. From this page, a user is able to select specific assets from the list, such as by selecting check boxes associated with the assets, and then selecting a "save" or similar option, such as is displayed in the financial impact page portion 500 of FIG. 5, which shows the financial impact of the selected assets. From here the user can have several options, such as by generating a list to be sent to finance. The list also can be saved for future use, such as to route to a department, do further investigation, or any other appropriate use.

Figure 6:
FIG. 6 illustrates an exemplary interface that can be used to email a list of exceptions and financial impact information to another user in accordance with one embodiment of the present invention.
Figure 7:
FIG. 7 illustrates an exemplary interface that can be used to manage a financial list of exceptions in accordance with one embodiment of the present invention.
Figures 8, 9:
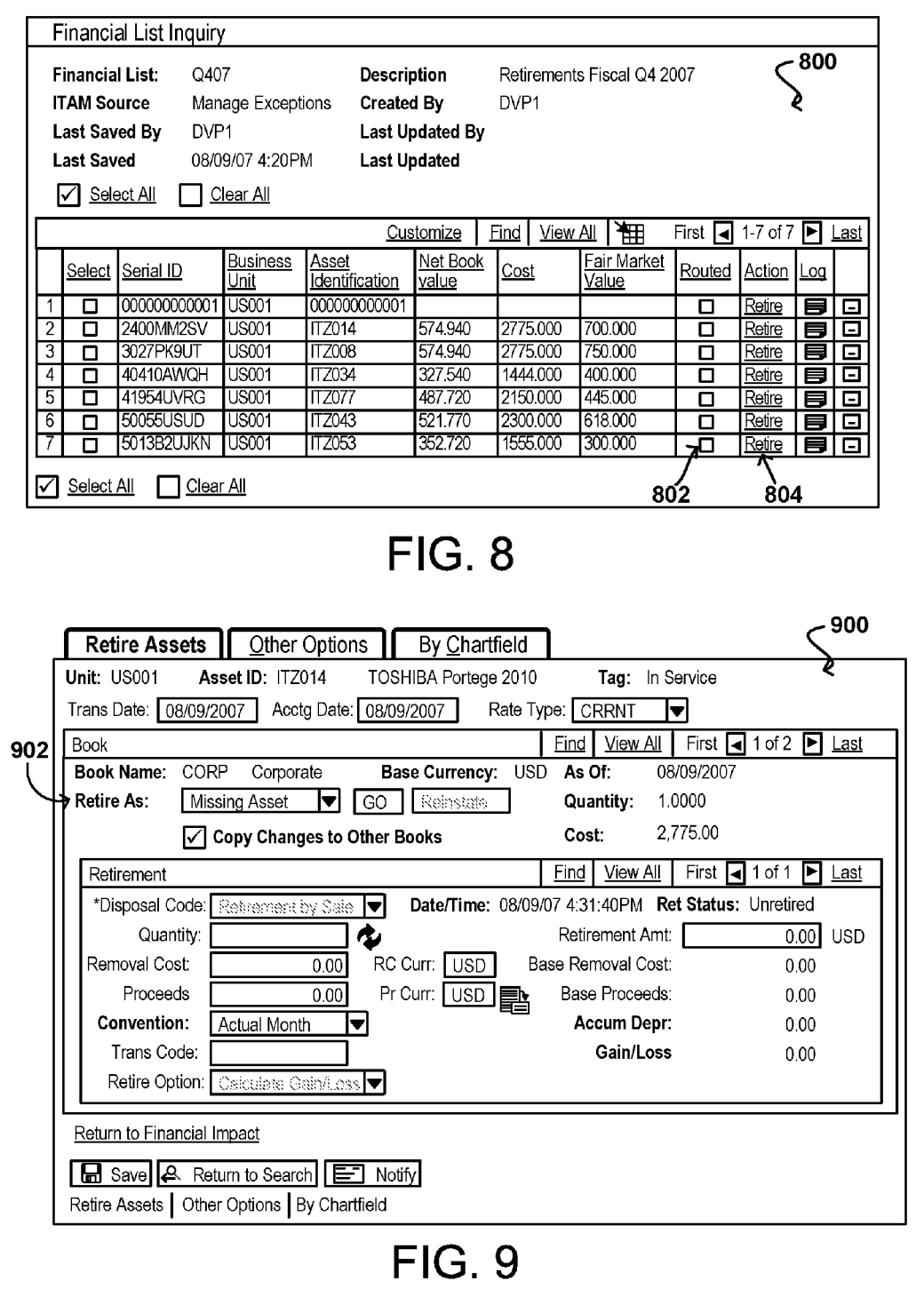

If the user selects an option such as a "notify finance" option 502, a message screen 600 can be displayed, as illustrated in FIG. 6, which has a default message recipient and allows the user to add role users or other appropriate users. The message also can have default but editable subject and body text, which can include a link or URL to the list created and saved by the user. A recipient then can click on a first link to access a manage exceptions page portion 700 such as is illustrated in FIG. 7, which can be part of the same application page as the portions of FIGS. 3, 4, and/or 5. In the manage exceptions page, the default value for the list is displayed, and the recipient, such as a finance manager, can have the ability to add options to filter the list to only display assets relevant to that recipient. If the finance manager selects the second link from the message, a financial list inquiry page 800 can be displayed as illustrated in FIG. 8. From the financial list inquiry, the finance manager can view identification information for each of the assets of the list, along with financial impact information such as the NBV, Cost, and FMV values. The finance manager then has the option to select an object 802 for routing, or retire 804 each asset by selecting the appropriate asset from the list.

Each time the finance manager selects an option to retire an asset, the finance manager can receive a retire assets page 900 such as is illustrated in FIG. 9. From this page, the finance manager can select an option 902 to designate why an asset is being retired, such as because the asset is missing or the asset is no longer functional. There can be various other information entered in such a page to be stored along with the information for the retired asset. After retiring the appropriate assets, the finance manager can view the list 1000 of remaining asset exceptions, such as is illustrated in FIG. 10, which includes an updated list and can be part of the same application page as that displayed in FIG. 8, and can see the financial impact of these remaining assets. From here, the finance manager can choose to save the list of remaining assets and/or route at least some of the remaining assets to another user based at least in part on the financial impact information.

FIG. 11 illustrates an exemplary page 1100 that can be displayed to a user if the user instead selects an "assets not reporting" option from the user's portal. From here, the pages can proceed such as is described above with the "asset not in discovery" flow.

Figure 12:
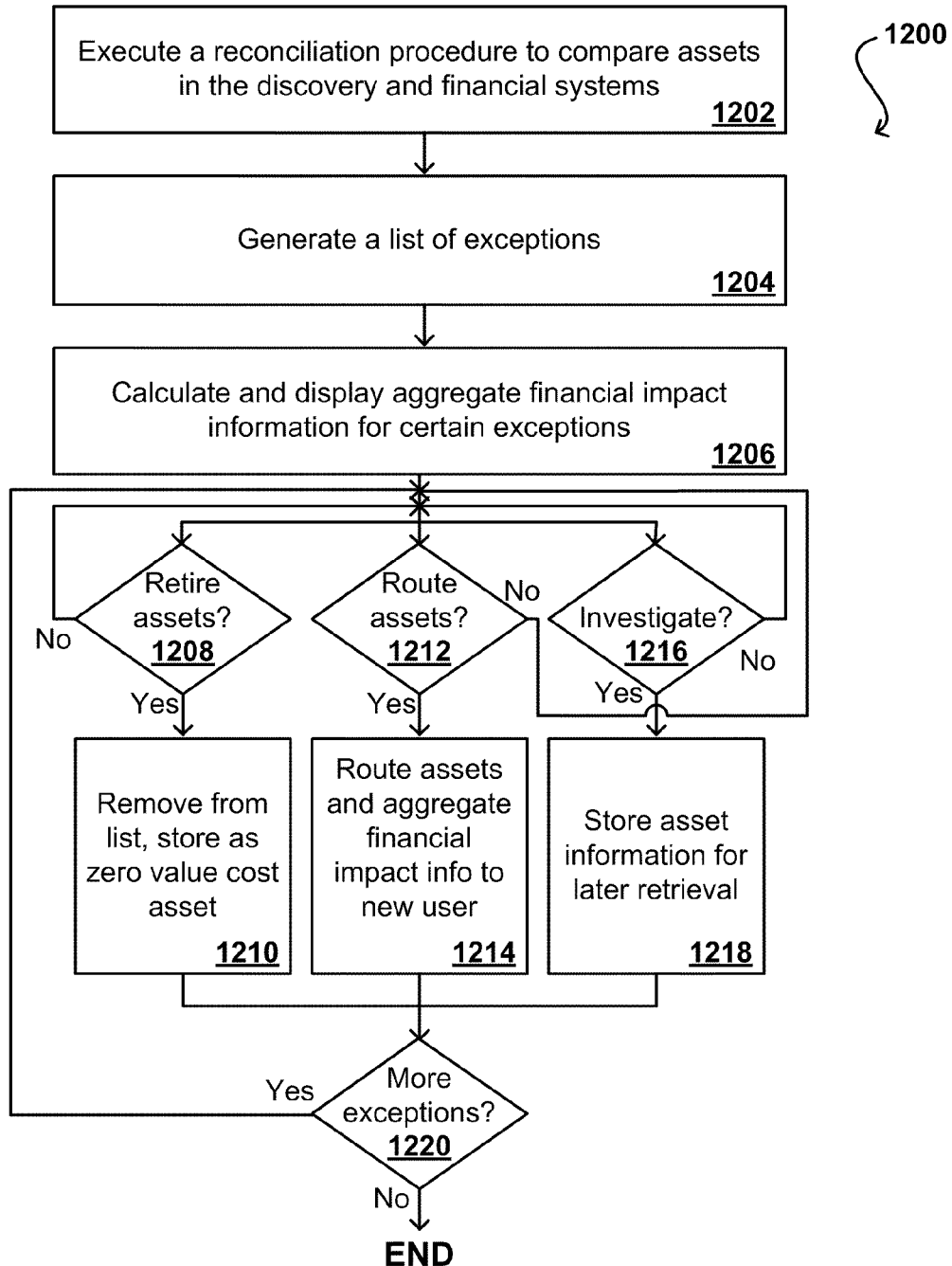
FIG. 12 illustrates steps of an exemplary process that can be used in accordance with one embodiment of the present invention.

FIG. 12 illustrates steps of a process 1200 for retiring or routing asset exceptions in accordance with one embodiment, which can utilize at least some of the pages and functionality described above. In the process, a reconciliation procedure is done to compare the physical asset information in the discovery system with financial asset information in a corresponding financial system 1202. A list of exceptions is generated where information for assets in the discovery system does not match information for assets in the financial system 1204. For assets that are located in the financial system but not in the discovery system, aggregate financial information is calculated and displayed next to the relevant exception information 1206. The financial information can include information such as cost, fair market value, and net market value, and can be calculated using any appropriate approach known or used in the art for calculating such values. If the user viewing the list of exceptions decides to retire at least some of the assets 1208, those assets are removed from the list of exceptions and stored as a zero cost asset in the financial system 1210. If the user viewing the list of exceptions decides to route at least some of the assets 1212, then the user can group the assets and route the assets and aggregate financial information for the grouped assets to another user 1214. If the user viewing the list of exceptions decides to investigate at least some of the assets 1216, then the user can save the list and return after the investigation 1218. If there are more exceptions in the list 1220, then the user can make further decisions regarding the list.

Another advantage to providing instant access to forecasting and aggregate information is that it can easily be determined whether there needs to be some reconciliation or other work done for Sarbanes-Oxley and audit purposes at the end of a quarter or fiscal year, for example. If there are discrepancies on the books and the net book values are material, and there are a number of assets recorded on the books that you no longer own and operate, then there can be resulting financial and audit implications that are important to know before the books are closed for that period. The ability to instantly view aggregate information will further enhance an enterprise's ability to be compliant. Even if those assets cannot be tracked, or if the enterprise wishes to further investigate those assets prior to retiring them, the enterprise can at least know the potential exposure, which is a key piece of financial information. It also is advantageous to know the amount of exposure instead of simply knowing that there are some assets lost across the organization but without any insight into the aggregate of all those missing assets.

In addition to advantages for quarter-end or year-end reporting, a finance department typically is mandated to report any material adjustments to their financial statements or forecasts in a timely manner. If the asset(s) to be written-off amounts to a material expense, finance may need to take immediate action to adjust their financial forecasts and notify the CFO of a material book to physical difference that may impact their quarterly results. Sarbanes-Oxley mandates that material information that could impact external results be disclosed in a timely fashion, and systems in accordance with the various embodiments can provide tools to ensure compliance with this mandate.

Having the financial asset list associated with finance actions such as asset retirement will assist the finance user in determining whether it is necessary to modify internal forecasts. Using the asset retirement example above with two assets that will impact the books upon retirement, assuming the finance manager proceeds with retiring these assets the system will immediately inform the manager that the associated impact of the retirement will be a $50,000 expense increase for the period. Assuming that this retirement was not in the financial forecast, the finance manager can now adjust the forecast accordingly to ensure the $50,000 expense is included.

In one embodiment a user viewing an enterprise view of assets across the organization is able to drill into the high level aggregate. A user can be provided with a search or select capability that allows the user to narrow the view by department, business unit, individual owner, or any other appropriate entity. For many situations, it will be sufficient from an investigative perspective to know when a particular department is over an allowable threshold such that a department manager can be notified to address the exceptions, for example. The tool also can allow a CFO or finance employee, for example, to generate lists of assets by department, business unit, geography, etc. The lists can include the aggregate information and can be routed to the responsible party.

Such a system can increase the efficiency of the financial manager as well as provide relevant information at the point when it is most needed. The financial managers will have a clear view of the impact of retiring or disposing of assets, and will have aggregate financial totals to assist them in the decision making process as well as for financial forecasts. Asset managers can have a tool to better group assets and inform finance of pending transactions via a built-in email tool. The highest-level metrics can present a complete look at the total financial impact if all assets were to be retired.

IT Asset Management Trend Charting

In various embodiments, systems and methods are provided to reconcile, visualize, and trend discrepancies in data from third party discovery vendors. In one embodiment, a number of metrics are presented to users of a financial system that help organizations view high level statistics of their organization for a given point in time. For example, the metrics may show the number of discrepancies for a given business rule that has been violated. Other metrics may show those assets that are no longer reporting on a physical network. In addition, metrics may project the financial impact of disposal of the assets. Metrics can also show the organizations software compliance, displaying the number of software licenses that are in use compared to the number of licenses that are owned by the organization. Another metric may display the total count of hardware across subtypes known to be in physical use on the financials books and where the hardware is not reconciled to both physical use and finance.

In further embodiments, metrics may present the data for a snapshot in time or include analytics, such as presenting the data over time to see how an organization is tracking towards a goal, such as compliance. Data for each execution of underlying metric data can be stored alongside a date for which the metric was run or executed. As metrics are run, calculations can take into account user setup (role access) for the assets for which they have control to view. Additional run control parameters could be set, for example for managing reconciliation discrepancies, to control whether or not to include exceptions that have been ignored by the user.

In some embodiments, a metrics engine can calculate monthly and quarterly averages to smooth out abnormal events or anomalies in the data. During the same process run, the process can calculate the year ago averages for monthly and quarterly average to present a year over year comparison. This comparison can be provided as hover text in a user interface when a user "mouses over" a chart's data points. A graphical user interface may provide both a previous period's values as well as the value represented as a percentage of change. Accordingly, an organization may be provided with visibility into how the organization is progressing against previous time spans.

In at least one embodiment, a system can be configured to both manage exceptions and assets not reporting so that a trending analysis can include those business rules or exceptions that are selected for trending or those inventory ages or subtypes of interest. There may be certain business rule exceptions that should be included and/or excluded from analysis, for example temporary rules, or rules based on geographies or asset types for which trending is not a valid business need. Furthermore a separate trending chart may show the forecasted financial impact of both the missing asset exceptions as well as those that are no longer reporting. The system may include metrics that differ slightly in that instead of tracking only the asset counts, the metrics may also track the value of the asset count as well as the asset count that needs to be disposed.

In at least one embodiment, a chart may be provided allowing a user to click on a bar chart or line graph data point to transfer corresponding data into a manage exceptions or assets not reporting component. The transfer may take the rule or inventory age as a search parameter for the component and execute a search to display the current exceptions or assets that are not reporting.

Figure 13:
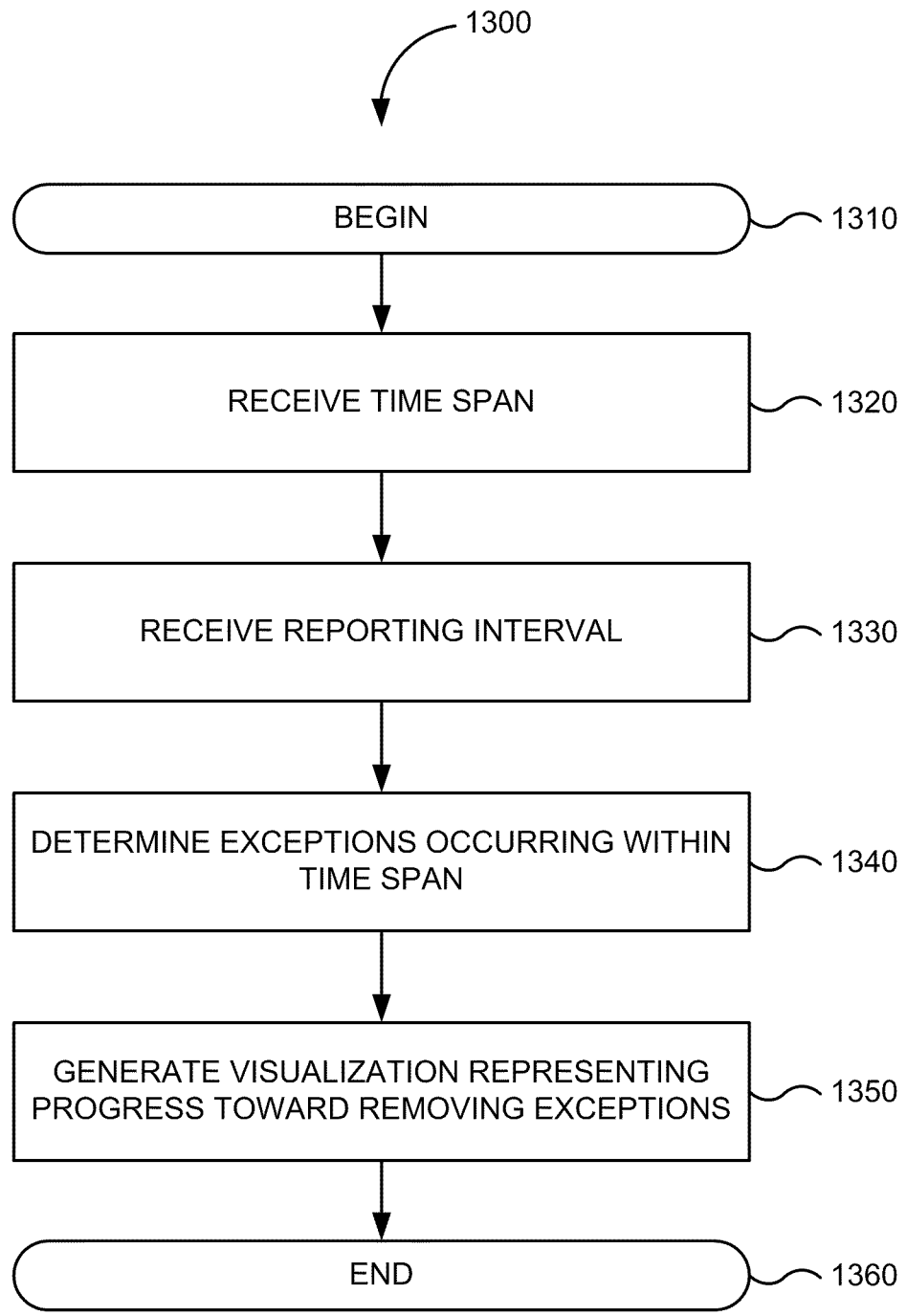
FIG. 13 illustrates steps of an exemplary process for visualizing process toward removing exceptions that can be used in accordance with one embodiment of the present invention.

FIG. 13 illustrates steps of an exemplary process for visualizing process toward removing exceptions that can be used in accordance with one embodiment of the present invention. Implementations of or processing in method 1300 depicted in FIG. 13 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1300 depicted in FIG. 13 begins in step 1310.

In step 1320, a time span is received. A time span may refer to any continuous interval or noncontinuous interval. Some examples of predetermined time spans that may be selected by a user may include a day, a week, a month, a quarter, a year, in the last X days, in the last X months, in the last X quarters, in the last X years, or the like.

In step 1330, a reporting interval is received. A time span may refer to a particular time instance or set of instances that occur within the time span. Some examples of reporting intervals that may be selected by a user may include per hour, per day, per week, per month, per quarter, per year, or the like.

In step 1340, one or more exceptions occurring within the time span are determined. For example, data for each execution of underlying metric data can be stored alongside a date for which the metric was run or executed. A list of exceptions may be received that satisfy a particular time span.

In step 1350, one or more visualizations are generated representing progress toward removing the one or more exceptions. For example, one or more charts may be generated. A chart may be pre-configured with various time spans including, daily weekly, monthly, quarterly, half yearly and for a year. Furthermore, a chart may show the forecasted financial impact of both the missing asset exceptions as well as those that are no longer reporting. FIG. 13 ends in step 1360.

In one implementation, a user may interact with a bar chart or line graph data point. For example, a mouse over event may be identified to provide a pop-up with further historical information. A user may click on a chart to transfer data into a manage exceptions or assets not reporting component. The transfer may take the rule or inventory age as a search parameter for the component and execute a search to display the current exceptions or assets that are not reporting.

Figure 14:
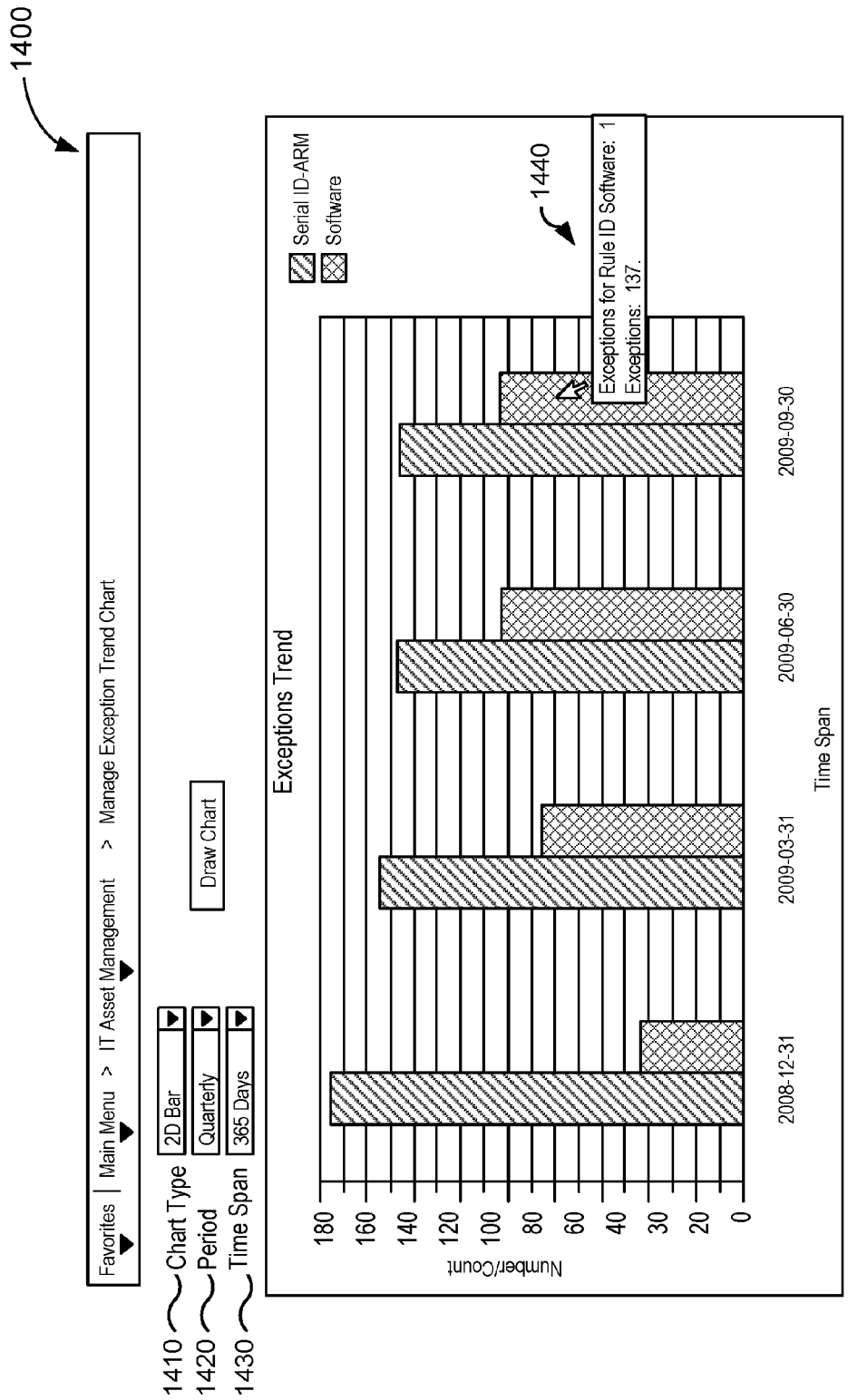
FIG. 14 illustrates an exemplary interface that can be used to create and display visualizations depicting progress toward removing exceptions in accordance with one embodiment of the present invention.

FIG. 14 illustrates an exemplary interface 1400 that can be used to create and display visualizations depicting progress toward removing exceptions in accordance with one embodiment of the present invention. In this example, a user may interact with user interface element 1410 to select one or more predetermined chart types. Some examples of chart types include bar charts, pie charts, line charts, 2D or 3D charts, or the like. A user may interact with user interface element 1420 to provide a time period or reporting interval. A user may interact with user interface element 1430 to provide a time span.

In some embodiments, year ago averages may be calculated for monthly and quarterly average to present a year over year comparison. User interface element 1440 may provide a comparison as hover text when the user "mouses over" a chart's data points. Both the previous period's values as well as the value represented as a percentage of change may also be included. Accordingly, interface 1400 may provide an organization visibility into how the organization is progressing toward goals, such as removing exceptions, against previous time spans.

FIG. 15 illustrates an exemplary portal 1500 (or dashboard) that can be used to display asset exceptions and asset management trends in accordance with one embodiment of the present invention. In various embodiments, a user may interact with portal 1500 to drill down to events to obtain additional details.

Figure 16:
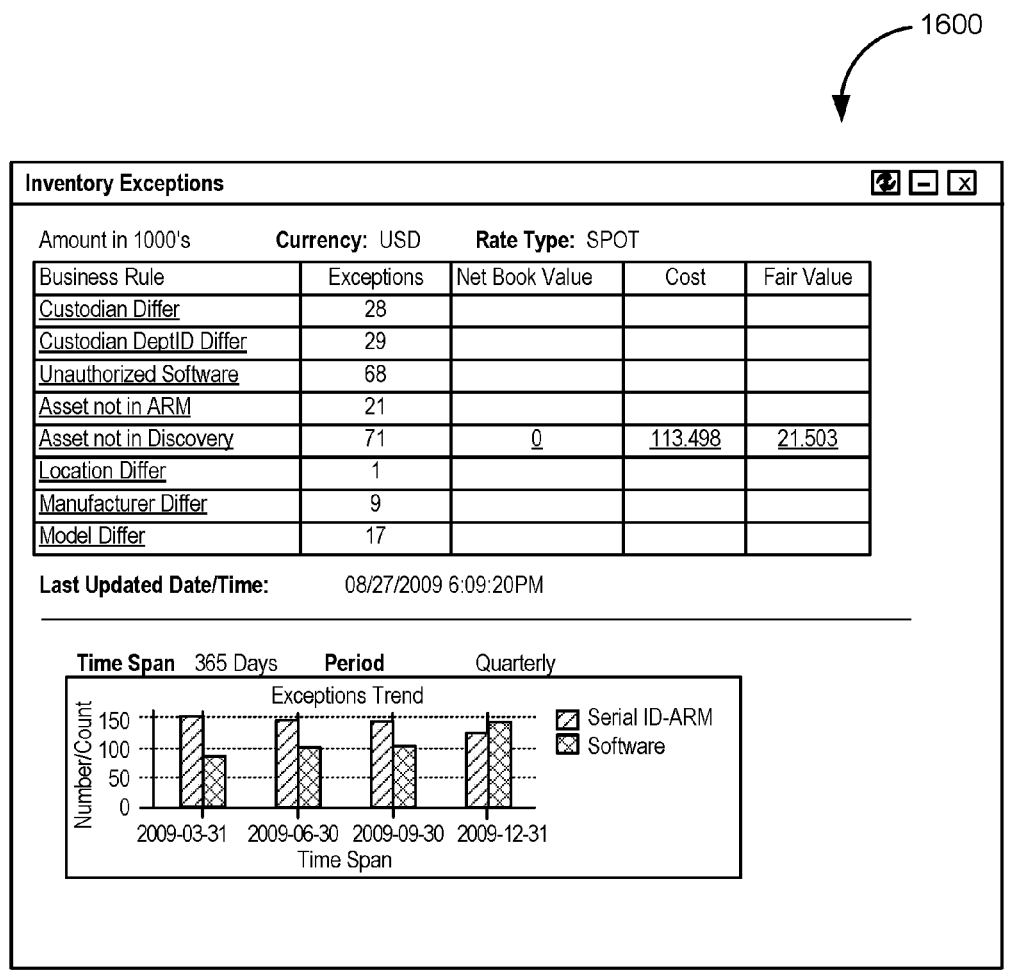
FIG. 16 illustrates an exemplary interface that can be used to display asset exceptions and asset management tends in accordance with one embodiment of the present invention.
Figure 17:
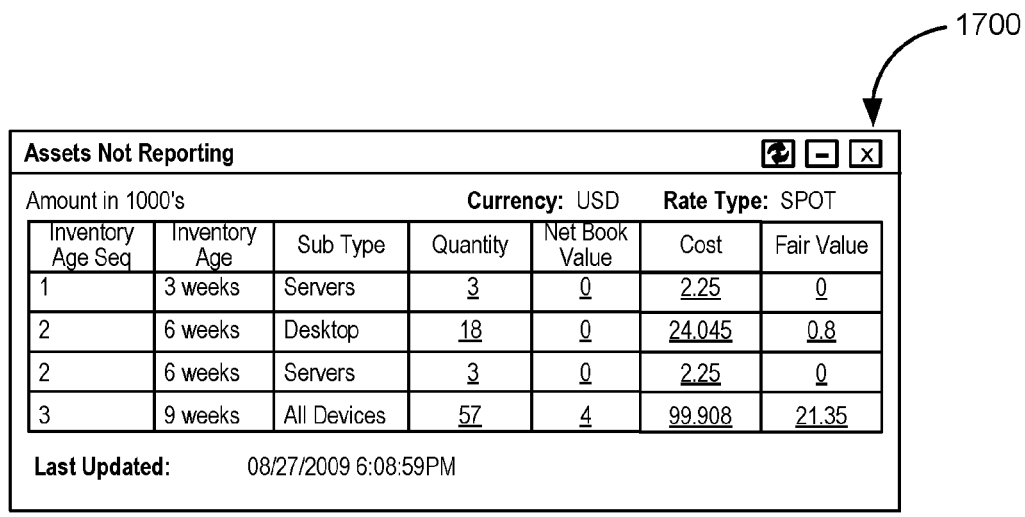
FIG. 17 illustrates an exemplary interface that can be used to display assets not reporting in accordance with one embodiment of the present invention.
Figure 18:
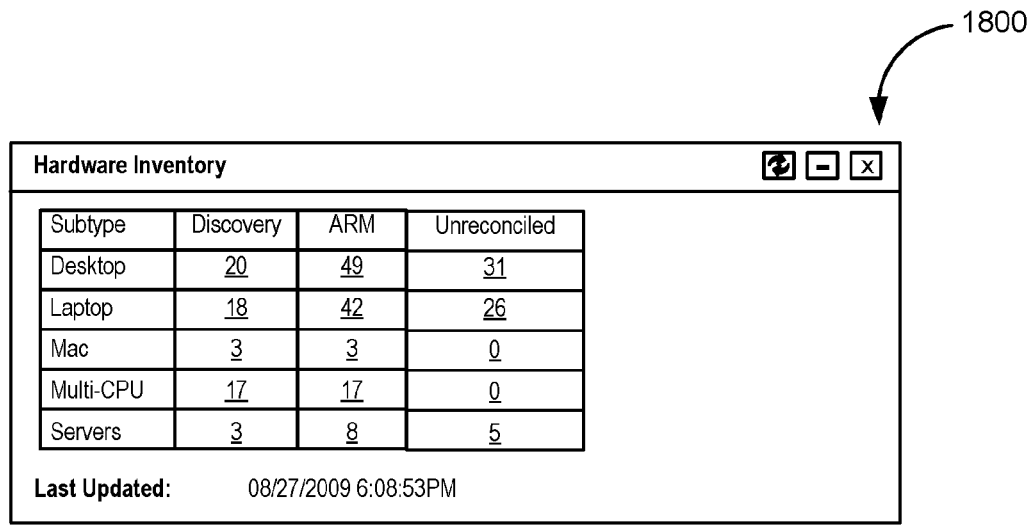
FIG. 18 illustrates an exemplary interface that can be used to display hardware inventory in accordance with one embodiment of the present invention.
Figure 19:
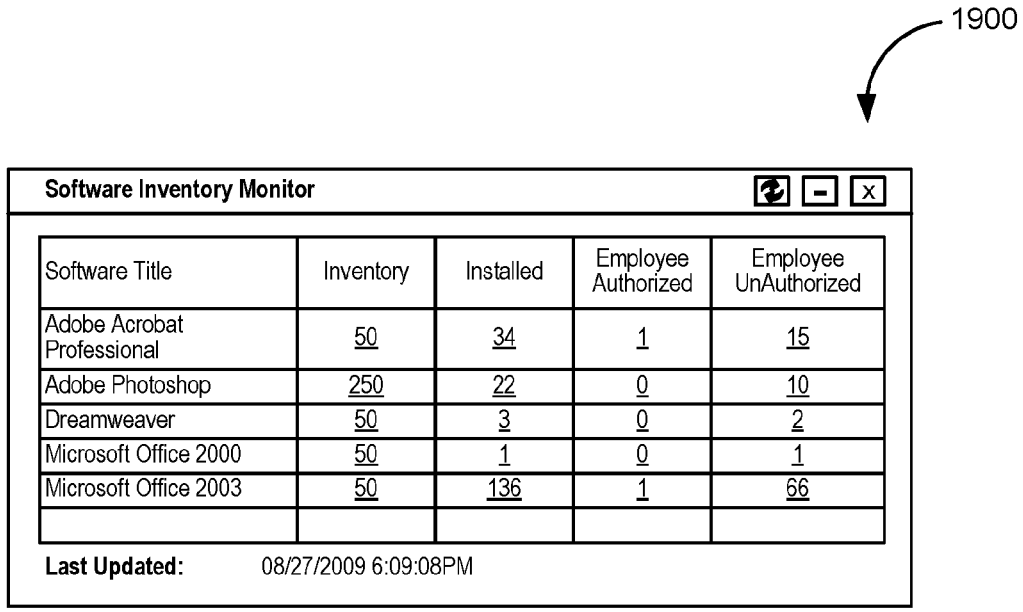
FIG. 19 illustrates an exemplary interface that can be used to display software inventory in accordance with one embodiment of the present invention.
Figure 20:
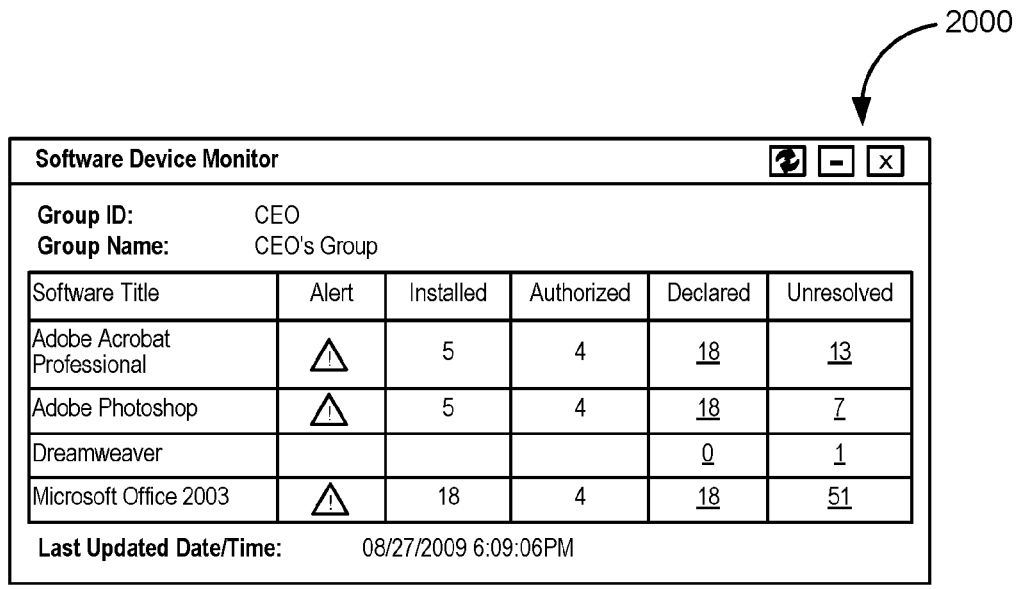
FIG. 20 illustrates an exemplary interface that can be used to display software device compliance in accordance with one embodiment of the present invention.

FIG. 16 illustrates an exemplary interface 1600 that can be used to display asset exceptions and asset management trends in accordance with one embodiment of the present invention. FIG. 17 illustrates an exemplary interface 1700 that can be used to display assets not reporting in accordance with one embodiment of the present invention. FIG. 18 illustrates an exemplary interface 1800 that can be used to display hardware inventory in accordance with one embodiment of the present invention. FIG. 19 illustrates an exemplary interface 1900 that can be used to display software inventory in accordance with one embodiment of the present invention. FIG. 20 illustrates an exemplary interface 2000 that can be used to display software device monitor in accordance with one embodiment of the present invention.

Figures 21, 22:
FIG. 21 illustrates an exemplary interface that can be used to modify business rules in accordance with one embodiment of the present invention.
FIG. 22 illustrates an exemplary interface that can be used to modify a user's role in accordance with one embodiment of the present invention.

In various embodiments, a system can further be configured to both manage exceptions and assets not reporting so the trending analysis will include those business rule exceptions that are selected for trending or those inventory ages or subtypes of interest. There may be certain business rule exceptions that should be included and/or excluded from analysis, for example temporary rules, or rules based on geographies or asset types for which trending is not a valid business need. FIG. 21 illustrates an exemplary interface 2100 that can be used to modify business rules in accordance with one embodiment of the present invention. In this example, a user may interface with interface 2100 to enable or disable trend analysis for the "Business Unit" rule.

In further embodiments, as metrics are run, calculations may take into account user setup (role access) for the assets for which they have control to view. Additional run control parameters could be set, for example, for managing reconciliation discrepancies, to control whether or not to include exceptions that have been ignored by the user. FIG. 22 illustrates an exemplary interface 2200 that can be used to modify a user's role access in accordance with one embodiment of the present invention.

In still further embodiments, a user may click on a bar chart or line graph data point to transfer data into a manage exceptions or assets not reporting component. The transfer may take the rule or inventory age as a search parameter for the component and execute a search to display the current exceptions or assets that are not reporting. FIG. 23 illustrates an exemplary interface 2300 that can be used to manage exceptions in the search results in accordance with one embodiment of the present invention.

Figure 24:
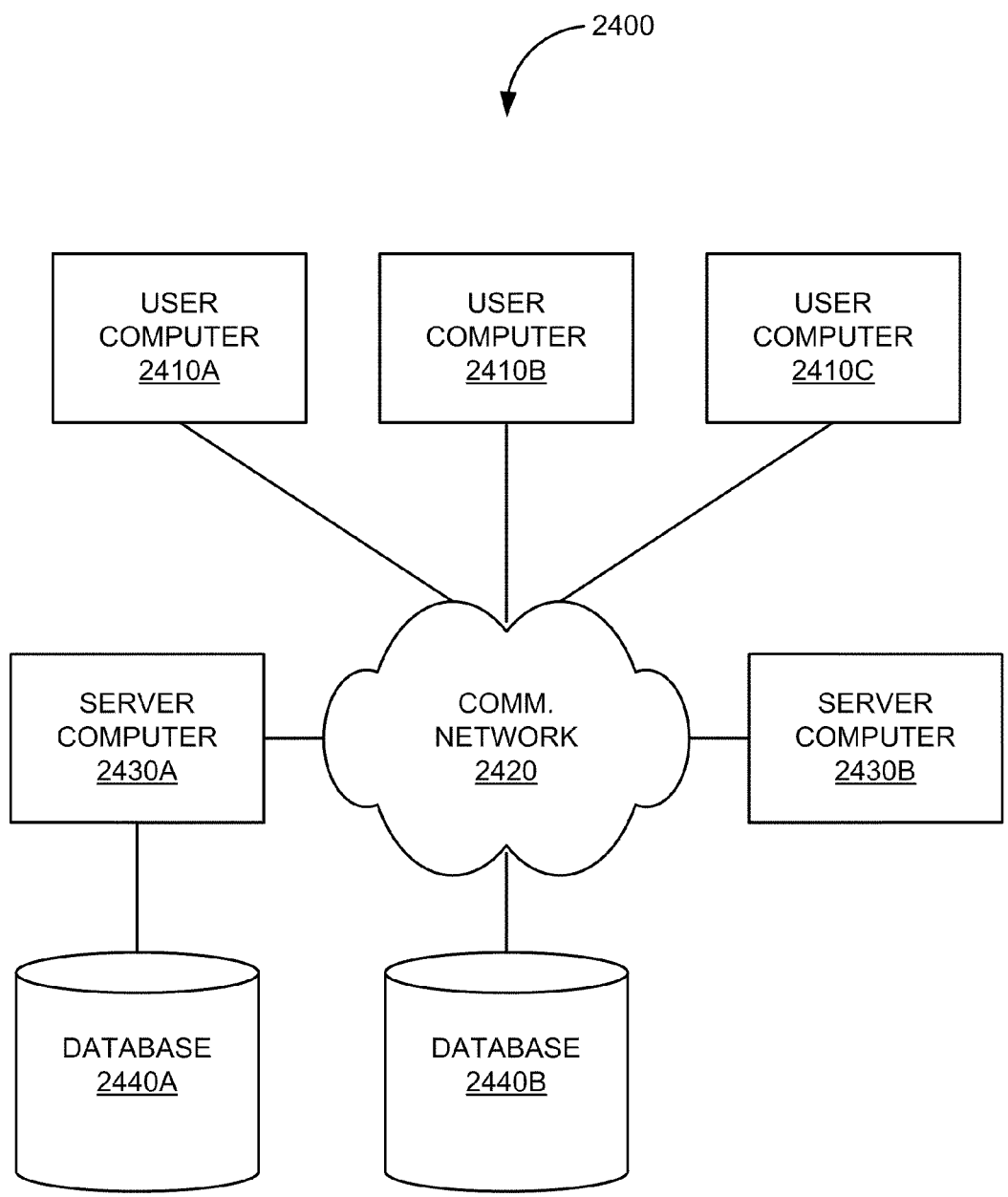
FIG. 24 is a simplified illustration of a system that may incorporate an embodiment of the present invention.

FIG. 24 is a simplified illustration of system 2400 that may incorporate an embodiment or be incorporated into an embodiment of any of the innovations, embodiments, and/or examples found within this disclosure. FIG. 24 is merely illustrative of an embodiment incorporating the present invention and does not limit the scope of the invention as recited in the claims. One of ordinary skill in the art would recognize other variations, modifications, and alternatives.

In one embodiment, system 2400 includes one or more user computers 2410 (e.g., computers 2410A, 2410B, and 2410C). User computers 2410 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 2410 can also have any of a variety of applications, including one or more applications configured to perform methods of the invention, as well as one or more office applications, database client and/or server applications, and web browser applications.

Alternatively, user computers 2410 can be any other electronic device, such as a thin-client computer, Internet-enabled mobile telephone, and/or personal digital assistant, capable of communicating via a network (e.g., communications network 2420 described below) and/or displaying and navigating web pages or other types of electronic documents. Although the exemplary system 2400 is shown with three user computers, any number of user computers or devices can be supported.

Certain embodiments of the invention operate in a networked environment, which can include communications network 2420. Communications network 2420 can be any type of network familiar to those skilled in the art that can support data communications using any of a variety of commercially-available protocols, including without limitation TCP/IP, SNA, IPX, AppleTalk, and the like. Merely by way of example, communications network 2420 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 2430 (e.g., computers 2430A and 2430B). Each of server computers 2430 may be configured with an operating system including without limitation any of those discussed above, as well as any commercially-available server operating systems. Each of server computers 2430 may also be running one or more applications, which can be configured to provide services to one or more clients (e.g., user computers 2410) and/or other servers (e.g., server computers 2430).

Merely by way of example, one of server computers 2430 may be a web server, which can be used, merely by way of example, to process requests for web pages or other electronic documents from user computers 2410. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 2410 to perform methods of the invention.

Server computers 2430, in some embodiments, might include one ore more file and or/application servers, which can include one or more applications accessible by a client running on one or more of user computers 2410 and/or other server computers 2430. Merely by way of example, one or more of server computers 2430 can be one or more general purpose computers capable of executing programs or scripts in response to user computers 2410 and/or other server computers 2430, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user computers 2410 and/or another of server computers 2430.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 2410 via a web server (as described above, for example). Similarly, a web server might receive web page requests and/or input data from one of user computers 2410 and/or forward the web page requests and/or input data to an application server.

In accordance with further embodiments, one or more of server computers 2430 can function as a file server and/or can include one or more of the files necessary to implement methods of the invention incorporated by an application running on one of user computers 2410 and/or another of server computers 2430. Alternatively, as those skilled in the art will appreciate, a file server can include all necessary files, allowing such an application to be invoked remotely by one or more of user computers 2410 and/or server computers 2430. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 2400 can include one or more databases 2440 (e.g., databases 2440A and 2440B). The location of the database(s) 2420 is discretionary: merely by way of example, database 2440A might reside on a storage medium local to (and/or resident in) server computer 2430A (and/or one or more of user computers 2410). Alternatively, database 2440B can be remote from any or all of user computers 2410 and server computers 2430, so long as it can be in communication (e.g., via communications network 2420) with one or more of these. In a particular set of embodiments, databases 2440 can reside in a storage-area network ("SAN") familiar to those skilled in the art. (Likewise, any necessary files for performing the functions attributed to user computers 2410 and server computers 2430 can be stored locally on the respective computer and/or remotely, as appropriate). In one set of embodiments, one or more of databases 2440 can be a relational database that is adapted to store, update, and retrieve data in response to SQL-formatted commands. Databases 2440 might be controlled and/or maintained by a database server, as described above, for example.

Figure 25:
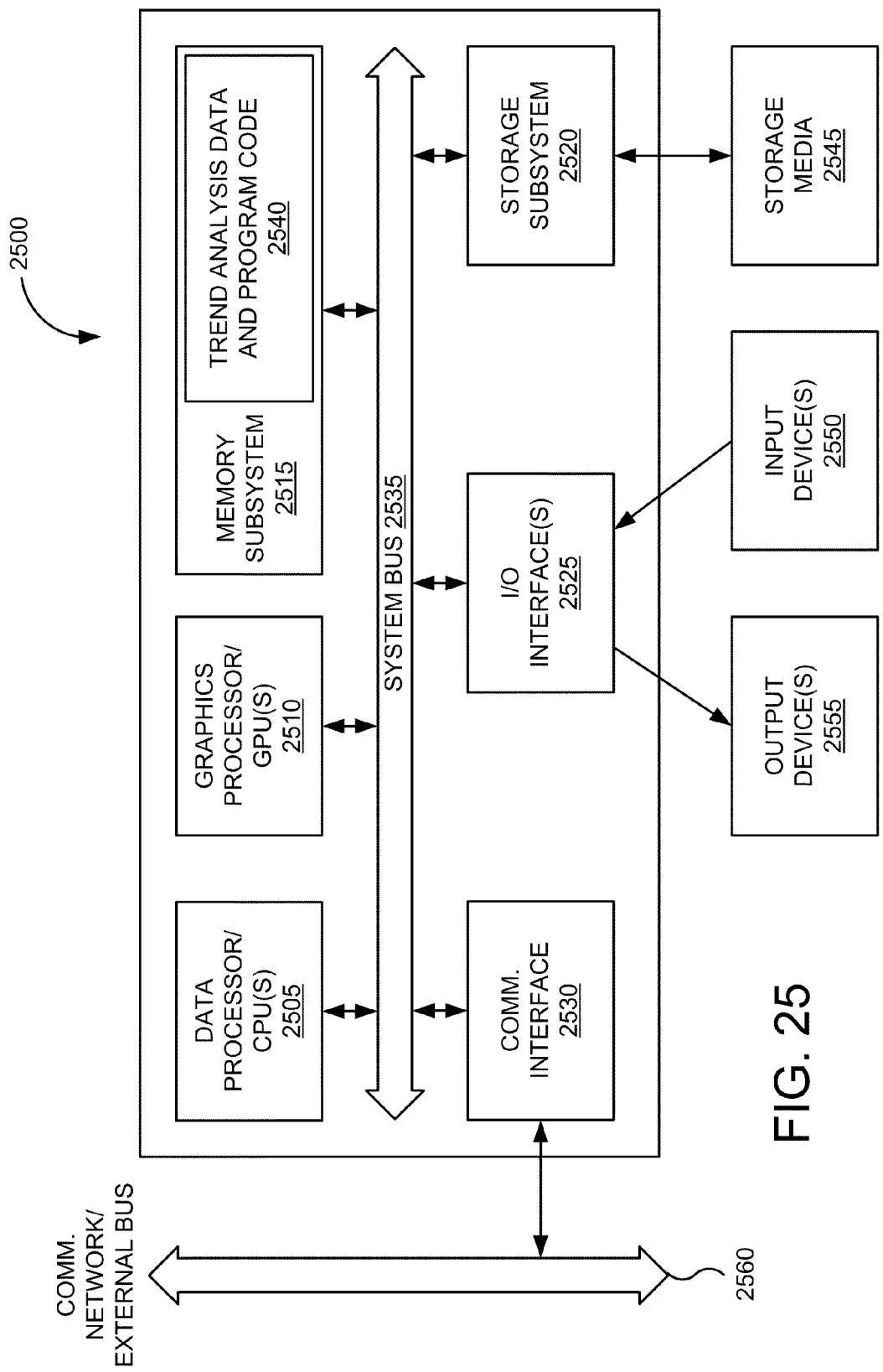
FIG. 25 is a block diagram of a computer system or information processing device that may incorporate an embodiment, be incorporated into an embodiment, or be used to practice any of the innovations, embodiments, and/or examples found within this disclosure.

FIG. 25 is a block diagram of computer system 2500 that may incorporate an embodiment, be incorporated into an embodiment, or be used to practice any of the innovations, embodiments, and/or examples found within this disclosure. FIG. 25 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 2500 can include hardware and/or software elements configured for performing logic operations and calculations, input/output operations, machine communications, or the like. Computer system 2500 may include familiar computer components, such as one or more one or more data processors or central processing units (CPUs) 2505, one or more graphics processors or graphical processing units (GPUs) 2510, memory subsystem 2515, storage subsystem 2520, one or more input/output (I/O) interfaces 2525, communications interface 2530, or the like. Computer system 2500 can include system bus 2535 interconnecting the above components and providing functionality, such connectivity and inter-device communication. Computer system 2500 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 2505 can include hardware and/or software elements configured for executing logic or program code or for providing application-specific functionality. Some examples of CPU(s) 2505 can include one or more microprocessors (e.g., single core and multi-core) or micro-controllers. CPUs 2505 may include 4-bit, 8-bit, 242-bit, 246-bit, 32-bit, 64-bit, or the like architectures with similar or divergent internal and external instruction and data designs. CPUs 2505 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 2505 may also include one or more field-gate programmable arrays (FPGAs), application-specific integrated circuits (ASICs), or other microcontrollers. The one or more data processors or central processing units (CPUs) 2505 may include any number of registers, logic units, arithmetic units, caches, memory interfaces, or the like. The one or more data processors or central processing units (CPUs) 2505 may further be integrated, irremovably or moveably, into one or more motherboards or daughter boards.

The one or more graphics processor or graphical processing units (GPUs) 2510 can include hardware and/or software elements configured for executing logic or program code associated with graphics or for providing graphics-specific functionality. GPUs 2510 may include any conventional graphics processing unit, such as those provided by conventional video cards. Some examples of GPUs are commercially available from NVIDIA, ATI, and other vendors. In various embodiments, GPUs 2510 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 2510 may include any number of registers, logic units, arithmetic units, caches, memory interfaces, or the like. The one or more data processors or central processing units (CPUs) 2505 may further be integrated, irremovably or moveably, into one or more motherboards or daughter boards that include dedicated video memories, frame buffers, or the like.

Memory subsystem 2515 can include hardware and/or software elements configured for storing information. Memory subsystem 2515 may store information using machine-readable articles, information storage devices, or computer-readable storage media. Some examples of these articles used by memory subsystem 2570 can include random access memories (RAM), read-only-memories (ROMS), volatile memories, nonvolatile memories, and other semiconductor memories. In various embodiments, memory subsystem 2515 can include trend charting data and program code 2540.

Storage subsystem 2520 can include hardware and/or software elements configured for storing information. Storage subsystem 2520 may store information using machine-readable articles, information storage devices, or computer-readable storage media. Storage subsystem 2520 may store information using storage media 2545. Some examples of storage media 2545 used by storage subsystem 2520 can include floppy disks, hard disks, optical storage media such as CD-ROMS, DVDs and bar codes, removable storage devices, networked storage devices, or the like. In some embodiments, all or part of trend charting data and program code 2540 may be stored using storage subsystem 2520.

In various embodiments, computer system 2500 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 2500 may also include one or more applications configured to execute, perform, or otherwise implement techniques disclosed herein. These applications may be embodied as trend charting data and program code 2540. Additionally, computer programs, executable computer code, human-readable source code, processing engines, or the like, and data, such as transaction data, models, objects, procedural descriptions, files, or the like, may be stored in memory subsystem 2515 and/or storage subsystem 2520.

The one or more input/output (I/O) interfaces 2525 can include hardware and/or software elements configured for performing I/O operations. One or more input devices 2550 and/or one or more output devices 2555 may be communicatively coupled to the one or more I/O interfaces 2525.

The one or more input devices 2550 can include hardware and/or software elements configured for receiving information from one or more sources for computer system 2500. Some examples of the one or more input devices 2550 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 2550 may allow a user of computer system 2500 to interact with one or more nongraphical or graphical user interfaces to enter a comment, select objects, icons, text, user interface widgets, or other user interface elements that appear on a monitor/display device via a command, a click of a button, or the like.

The one or more output devices 2555 can include hardware and/or software elements configured for outputting information to one or more destinations for computer system 2500. Some examples of the one or more output devices 2555 can include a printer, a fax, a feedback device for a mouse or joystick, external storage systems, a monitor or other display device, a communications interface appropriately configured as a transceiver, or the like. The one or more output devices 2555 may allow a user of computer system 2500 to view objects, icons, text, user interface widgets, or other user interface elements.

A display device or monitor may be used with computer system 2500 and can include hardware and/or software elements configured for displaying information. Some examples include familiar display devices, such as a television monitor, a cathode ray tube (CRT), a liquid crystal display (LCD), or the like.

Communications interface 2530 can include hardware and/or software elements configured for performing communications operations, including sending and receiving data. Some examples of communications interface 2530 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 2530 may be coupled to communications network/external bus 2580, such as a computer network, to a FireWire bus, a USB hub, or the like. In other embodiments, communications interface 2530 may be physically integrated as hardware on a motherboard or daughter board of computer system 2500, may be implemented as a software program, or the like, or may be implemented as a combination thereof.

In various embodiments, computer system 2500 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 2500.

As suggested, FIG. 25 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A computer-implemented method for discovering assets across a network, the method comprising:
    performing discovery with an application installed on a plurality of devices communicatively coupled to a server system via a network, wherein the performing discovery comprises determining inventory information for the plurality of devices across the network;
    identifying, by the server system, information received by the server system specifying a time span;
    identifying, by the server system, information received by the server system specifying a reporting interval;
    determining, by the server system, an asset exception that occurs at each reporting interval within the time span, the asset exception triggered in response to a determination that an asset corresponding to financial asset information for the asset in a financial system lacks corresponding physical asset information for the asset in an asset discovery system, wherein the asset exception corresponds to one or more alert conditions;
    generating, by the server system, an exception notification to transmit to at least one computing device;
    transmitting the exception notification over a wireless communication channel to the computing device when the computing device is not online with a portal facilitated by the server system, the exception notification causing an installed application on the computing device to display a prompt corresponding to the asset exception, the prompt comprising a hyperlink to facilitate Internet-based communication between the computing device and the server system when the computing device comes online;
    generating, by the server system, a visualization combining progress over time toward removing all asset exceptions and an aggregate financial impact of removing the asset exception that occurs at each reporting interval, the visualization to facilitate content display based at least in part on the asset exception in response to a mouse-over event associated with the visualization; and
    transmitting, by the server system, one or more transmissions to the computing device to cause display of the visualization, the one or more transmissions to facilitate displaying content based at least in part on the mouse-over event associated with the visualization so that, when the mouse-over event corresponds to a pointing device controlling a pointer to hover over a visual indication of a particular year, the content is displayed to indicate a year-to-year comparison;
    wherein the year-to-year comparison indicates one or more calculated values based on calculated values attributed to one or more years prior to the particular year.

2. The method of claim 1, further comprising:
    determining, by the server system, the aggregate financial impact of removing the asset exception at each reporting interval based on determining that the asset exception is of a first type; and
    the generating, by the server system, the visualization combining progress over time toward removing all asset exceptions and the aggregate financial impact of removing the asset exception that occurs at each reporting interval comprises generating the visualization to include functionality configured to provide access to an aggregate financial impact of a set of asset exceptions of the first type.

3. The method of claim 1, further comprising:
receiving, by the server system, a selection of a datapoint associated with the visualization; and
generating, by the server system, information configured for displaying details associated with an event correlated to the datapoint.

4. The method of claim 1, further comprising:
generating, by the server system, information configured for displaying an exception based on the mouse-over event.

5. The method of claim 1, further comprising:
generating, by the server system, information configured for displaying historical details based on the mouse-over event.

6. The method of claim 1, wherein the generating, by the server system, the visualization combining progress over time toward removing all asset exceptions and the aggregate financial impact of removing the asset exception that occurs at each reporting interval comprises generating one or both of a bar chart and a line graph.

7. The method of claim 1, wherein the one or more transmissions cause display of a page including the visualization represented as a plurality of pagelets.

8. A non-transitory, computer-readable medium storing program code that when executed by a server system configures the server system for discovering assets across a network, and causes the server system to perform:
performing discovery with an application installed on a plurality of devices communicatively coupled to the server system via a network, wherein the performing discovery comprises determining inventory information for the plurality of devices across the network;
identifying information received by the server system specifying a time span;
identifying information received by the server system specifying a reporting interval;
determining an asset exception that occurs at each reporting interval within the time span, the asset exception triggered in response to a determination that an asset corresponding to financial asset information for the asset in a financial system lacks corresponding physical asset information for the asset in an asset discovery system, wherein the asset exception corresponds to one or more alert conditions;
generating an exception notification to transmit to at least one computing device;
transmitting the exception notification over a wireless communication channel to the computing device when the computing device is not online with a portal facilitated by the server system, the exception notification causing an installed application on the computing device to display a prompt corresponding to the asset exception, the prompt comprising a hyperlink to facilitate Internet-based communication between the computing device and the server system when the computing device comes online;
generating a visualization combining progress over time toward removing all asset exceptions and an aggregate financial impact of removing the asset exception that occurs at each reporting interval, the visualization to facilitate content display based at least in part on the asset exception in response to a mouse-over event associated with the visualization; and
transmitting one or more transmissions to the computing device to cause display of the visualization, the one or more transmissions to facilitate displaying content based at least in part on the mouse-over event associated with the visualization so that, when the mouse-over event corresponds to a pointing device controlling a pointer to hover over a visual indication of a particular year, the content is displayed to indicate a year-to-year comparison;
wherein the year-to-year comparison indicates one or more calculated values attributed to one or more years prior to the particular year.

9. The non-transitory, computer-readable medium of claim 8, wherein:
determining the aggregate financial impact of removing the asset exception at each reporting interval based on determining that the asset exception is of a first type; and
the generating the visualization combining progress over time toward removing all asset exceptions and the aggregate financial impact of removing the asset exception that occurs at each reporting interval comprises generating the visualization to include functionality configured to provide access to an aggregate financial impact of a set of asset exceptions of the first type.

10. The non-transitory, computer-readable medium of claim 8, wherein the program code further causes the server system to perform:
processing a selection of a datapoint associated with the visualization; and
generating information configured for displaying details associated with an event correlated to the datapoint.

11. The non-transitory, computer-readable medium of claim 8, wherein the program code further causes the server system to perform:
generating information configured for displaying an exception based on the mouse-over event.

12. The non-transitory, computer-readable medium of claim 8, wherein the program code further causes the server system to perform:
generating information configured for displaying historical details based on the mouse-over event.

13. The non-transitory, computer-readable medium of claim 8, wherein the generating the visualization combining progress over time toward removing all asset exceptions and the aggregate financial impact of removing asset exception that occurs at each reporting interval comprises code for generating one or both of a bar chart and a line graph.

14. The non-transitory, computer-readable medium of claim 8, wherein the one or more transmissions cause display of a page including the visualization represented as a plurality of pagelets.

15. A system for discovering assets across a network, the system comprising:
a server system comprising one or more servers and a memory storing one or more instructions that when executed by the server system configure the server system to:
perform discovery with an application installed on a plurality of devices communicatively coupled to server system via a network, wherein the performing discovery comprises determining inventory information for the plurality of devices across the network;
identify information received by the server system specifying a time span;
identify information received by the server system specifying a reporting interval;

determine an asset exception that occurs at each reporting interval within the time span, the asset exception triggered in response to a determination that an asset corresponding to financial asset information for the asset in a financial system lacks corresponding physical asset information for the asset in an asset discovery system, wherein the asset exception corresponds to one or more alert conditions;

generate an exception notification to transmit to at least one computing device;

transmitting the exception notification over a wireless communication channel to the computing device when the computing device is not online with a portal facilitated by the server system, the exception notification causing an installed application on the computing device to display a prompt corresponding to the asset exception, the prompt comprising a hyperlink to facilitate Internet-based communication between the computing device and the server system when the computing device comes online;

generate a visualization combining progress over time toward removing all asset exceptions and an aggregate financial impact of removing the asset exception that occurs at each reporting interval, the visualization to facilitate content display based at least in part on the asset exception in response to a mouse-over event associated with the visualization; and transmit one or more transmissions to the computing device to cause display of the visualization, the one or more transmissions to facilitate displaying content based at least in part on the mouse-over event associated with the visualization so that, when the mouse-over event corresponds to a pointing device controlling a pointer to hover over a visual indication of a particular year, the content is displayed to indicate a year-to-year comparison;

wherein the year-to-year comparison indicates one or more calculated values attributed to one or more years prior to the particular year.

16. The system of claim 15, wherein:

determining the aggregate financial impact of removing the asset exception at each reporting interval based on determining that the asset exception is of a first type; and the generating the visualization combining progress over time toward removing all asset exceptions and the aggregate financial impact of removing the asset exception that occurs at each reporting interval comprises generating the visualization to include functionality configured to provide access to an aggregate financial impact of a set of asset exceptions of the first type.

17. The system of claim 15, wherein the server system is further configured to:

process a selection of a datapoint associated with the visualization; and generate information configured for displaying details associated with an event correlated to the datapoint.

18. The system of claim 15, wherein the server system is further configured to:

generate information configured for displaying an exception based on the mouse-over event; and generate information configured for displaying historical details based on the mouse-over event.

* * * * *

UNITED STATES PATENT AND TRADEMARK OFFICE
CERTIFICATE OF CORRECTION

PATENT NO. : 10,007,951 B2
APPLICATION NO. : 12/845376
DATED : June 26, 2018
INVENTOR(S) : Alonzo et al.

Page 1 of 1

It is certified that error appears in the above-identified patent and that said Letters Patent is hereby corrected as shown below:

In the Specification

In Column 15, Line 15, delete "ore" and insert -- or --, therefor.

In Column 16, Line 64, delete "and or" and insert -- and/or --, therefor.

Signed and Sealed this
Second Day of April, 2019

Andrei Iancu
*Director of the United States Patent and Trademark Office*